United States Patent

[11] 3,587,505

[72] Inventors Paul S. Wells
619 First St., Mount Vernon, Wash. 98273;
Stephen P. Henderson, 14 Los Cerros
Drive, Greenbrae, Calif. 94904; Loring C.
Norgaard, San Fransisco, Calif.
[21] Appl. No. 31,208
[22] Filed Apr. 23, 1970
[45] Patented June 28, 1971
[73] Assignee said Norgaard assignor to said Wells and said Henderson

[54] PARTIALLY SUBMERSIBLE CARRIER VESSEL
10 Claims, 7 Drawing Figs.
[52] U.S. Cl. .................................................... 114/43.5,
114/72
[51] Int. Cl. ...................................................... B63b 35/44,
B63b 25/02
[50] Field of Search ............................................ 114/0.5, 0.5
(D), 16, 10, 43.5, 56, 61, 72

[56] References Cited
UNITED STATES PATENTS

| | | | | |
|---|---|---|---|---|
| 441,193 | 11/1890 | Purdy............................. | | 114/10 |
| 1,107,741 | 8/1914 | Ballin et al..................... | | 114/43.5 |
| 3,046,926 | 7/1962 | Miller............................. | | 114/61 |
| 3,403,652 | 10/1968 | Hardy............................. | | 114/43.5 |

Primary Examiner—Trygve M. Blix
Attorney—Seed, Berry and Dowrey

ABSTRACT: A carrier vessel for transporting cargo barges has multiple relatively low draft, hulls with a cargo deck supported by the hull section, and sidewall and bow and stern structures extending upwardly above the cargo deck so as to provide a peripherally confined cargo barge area bottomed by the cargo deck, barge access to the cargo deck being through a stern closure in the stern structure. The vessel is provided with a water ballasting capability for lowering the vessel so as to submerse the cargo deck to a depth greater than the draft of the cargo barges for ingress and egress of the cargo barges, for clearing the cargo deck of water so as to position cargo barges on the cargo deck, and for raising the vessel to a normal cruising level.

PAUL S. WELLS
STEPHEN P. HENDERSON
LORING C. NORGAARD
INVENTOR.

BY Seed, Berry & Dowrey
ATTORNEYS

PAUL S. WELLS
STEPHEN P. HENDERSON
LORING C. NORGAARD
INVENTOR.

BY Seed, Berry + Dowrey

ATTORNEYS

PAUL S. WELLS
STEPHEN P. HENDERSON
LORING C. NORGAARD
INVENTOR.

BY Seed, Berry & Dorsey

ATTORNEYS

PARTIALLY SUBMERSIBLE CARRIER VESSEL

This invention is a seagoing ship designed to carry a plurality of low-draft cargo barges. The carrier vessel is partially submersible to enable loaded cargo barges to be floated into or out of docked positions with respect to the vessel's submerged cargo deck.

Conventional seagoing cargo ships are loaded and unloaded while docked alongside a cargo-handling pier facility. Although these pier facilities have become mechanized and adapted to handle containerized cargo shipments, the time consumed in vessel loading and unloading, and in cargo marshalling, storage and dockside manipulation continues to increase. The seriousness of this problem is illustrated by the development of complicated and expensive shipping systems designed to minimize or eliminate conventional inport handling of cargo.

One recent system for shipping containerized cargo by sea without utilizing conventional docking facilities and techniques is the deep-draft seagoing vessel provided with a cargo hold designed to accommodate a large number of 200-—250 ton, low-draft cargo barges. The carrier ship is provided with shipboard barge-lifting means and shipboard barge-transporting means, typically combined in a rail mounted, propellable gantry crane that straddles the cargo hold. The carrier ship is designed to load and unload without occupying dock space and the low-draft barges can be towed to or from locations that could not accommodate the deep-draft carrier ship. There exist several limitations to this system, however. One is that the operability of the system is dependent on the mechanical health of the shipboard cargo barge handling machinery, which sometimes necessitates duplicating this machinery or limiting the destinations to those ports-of-call having sophisticated heavy machinery repair facilities. Second is that the cost of the carrier vessel and its shipboard barge-handling machinery, coupled with relatively small capacity barges, limits economic utilization of the system to the transport of high value cargo such as manufactured goods. The small capacity barges also have created a cargo marshalling problem in that effective use of this system requires the inport pooling of loaded barges prior to arrival of the carrier vessel. These limitations virtually eliminate consideration of this system for transporting cargo to or from undeveloped ports or for transporting bulk, relatively low value cargo such as raw or processed minerals, wood products, unprocessed fruit, and the like.

The present invention is designed to provide a seagoing transportation system suited for transporting cargo previously loaded in barges with substantially less expense than heretofore known. This system is particularly suitable for economically transporting bulk, relatively low value cargo and for transporting cargo to or from undeveloped ports. A primary feature of this system is the provision of the carrier vessel with the ability to partially submerse its cargo deck such that cargo barges can be loaded and unloaded by being floated into and out of position with respect to the submersed cargo deck. The carrier vessel of the present invention is of a design that is uniquely capable of providing a large cargo deck area suitable for accommodating large tonnage cargo barges. Furthermore, this design is unusually seaworthy in all modes of its operation and, in particular, exhibits a high degree of stability under partially-submersed, cargo barge loading/unloading conditions. Still further, this design provides a high tonnage carrier vessel of moderate draft suited for entry into ports heretofore incapable of accommodating large cargo vessels.

These and other objects and advantages of the present invention will become apparent from the following description and the accompanying drawings, of which:

Figure 2:
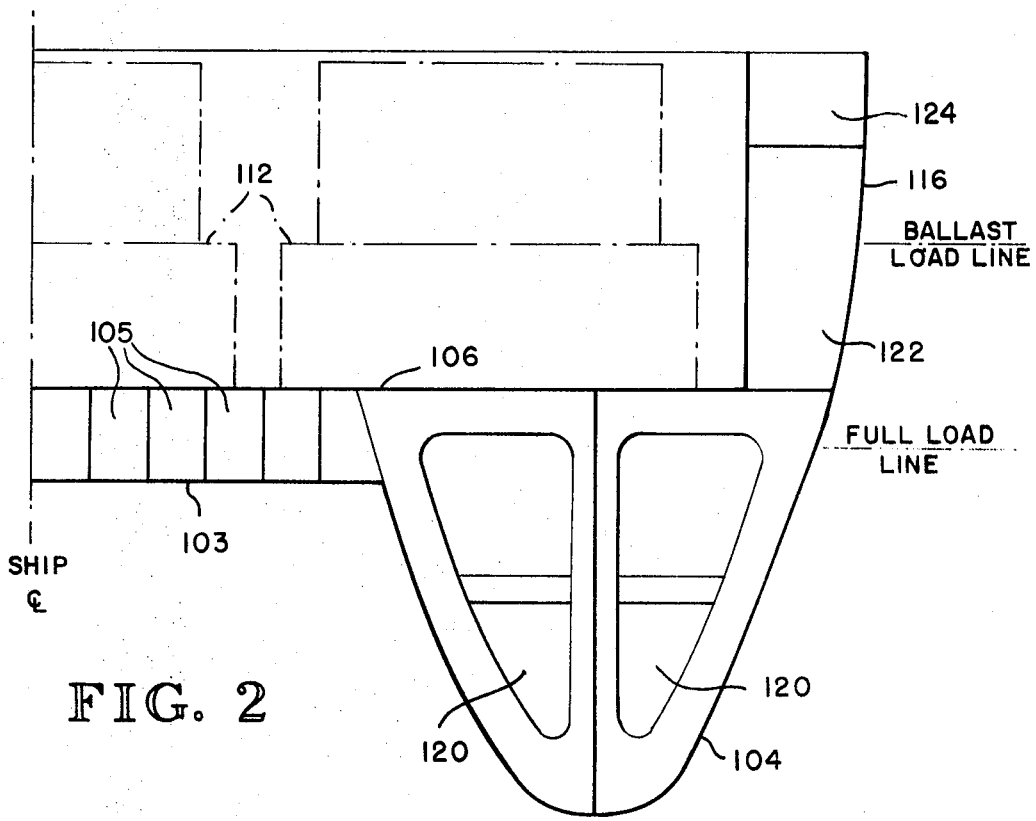
FIG. 2 is a partial vertical cross section of the FIG. 1 embodiment.
Figure 1:
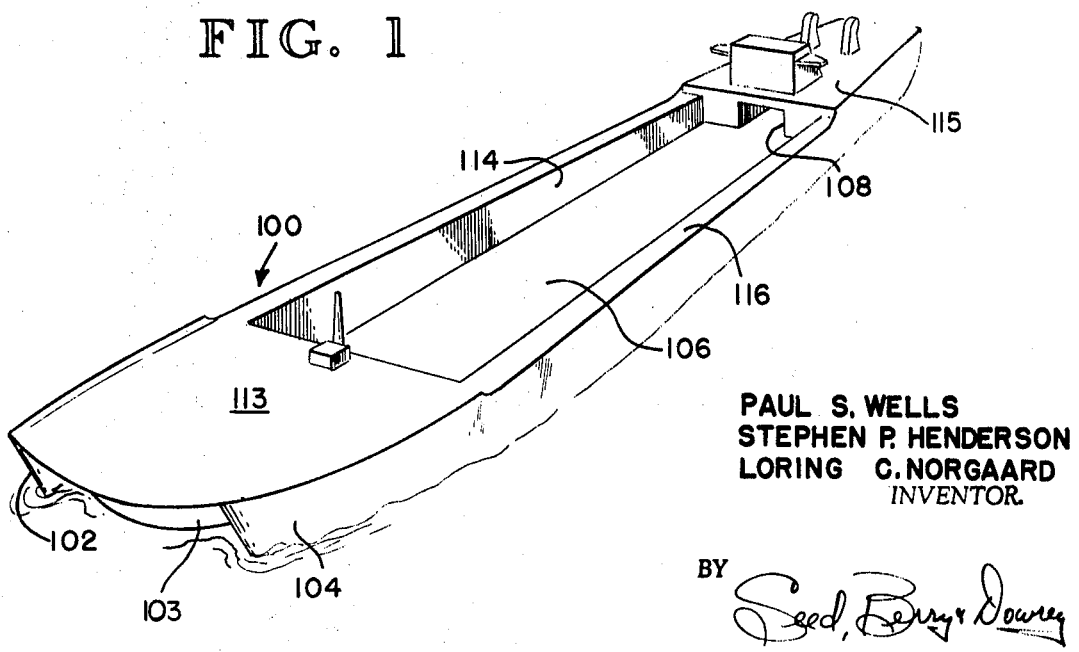
FIG. 1 is a perspective view of a preferred embodiment of the carrier vessel of this invention.
Figure 3:
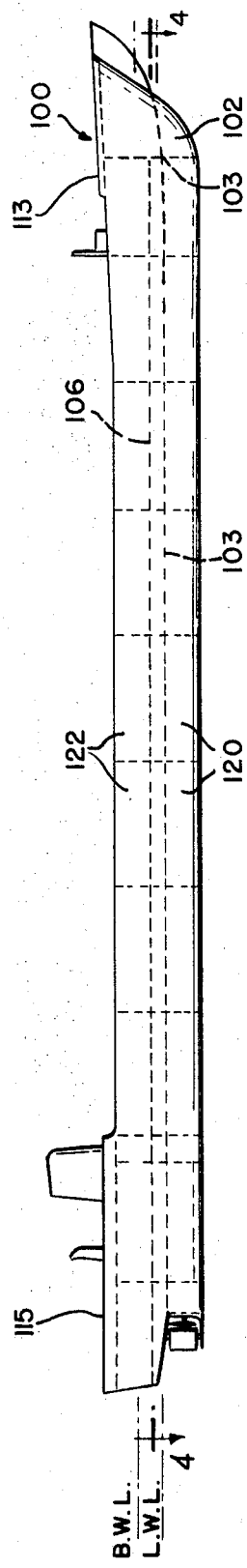
FIG. 3 is a side elevation view of the FIG. 1 embodiment.
Figure 4:
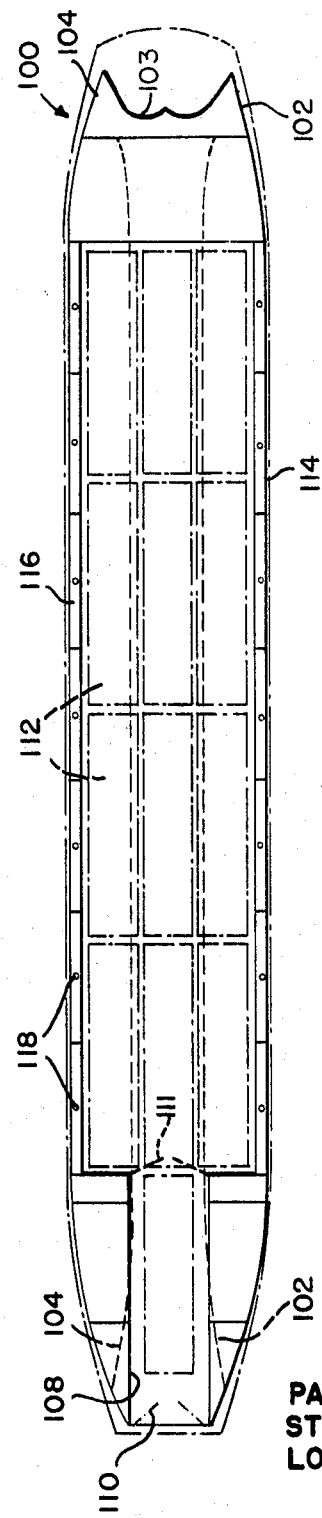
FIG. 4 is a top plan view of the FIG. 1 embodiment taken at the main deck elevation.

In brief, the partially submersible carrier vessel of this invention provides a large cargo deck area carried by a hull structure of novel design. The cargo deck area is enclosed by integral bow, stern and side structures that contribute to the rigidity and strength of the vessel as well as providing a protective enclosure for barges positioned within the vessel. The stern structure is provided with watertight doors provided for stern access to and from the barge cargo deck area. More particularly, the carrier vessel of this invention comprises twin hull structures interconnected by a midspan structure, a sidewall structure upstanding from each twin hull structure and bow and stern structures. The hull and midspan structures are interrelated such that the midspan structure is water-displacing under all normal operating conditions. A cargo deck is superimposed on the hull and midspan structures so as to occupy the substantial majority of their combined areas and so as to be enclosed by the sidewall and bow and stern structures.

The hull structures and the sidewall structures are provided with water ballasting facilities for partially submersing the carrier vessel to a depth sufficient to lower the cargo deck below the water line, and the raising the vessel to a normal cruising position. The sidewall structures are also adapted to retain air so as to provide added buoyancy to the vessel when in a partially submersed condition.

The carrier vessel is adapted to enable the cargo deck to be flooded during partial submersion such that loaded cargo barges can be floated into or out of position with respect to the cargo deck. The carrier vessel is also adapted to enable the cargo deck area to be cleared of water when the vessel is to be returned to its normal cruising level. The carrier vessel is further adapted to position and maintain the position of cargo barges over the cargo deck until the cargo barges are firmly seated on the cargo deck.

Referring to FIG. 1—4, the carrier vessel depicted combines multiple large-tonnage cargo barge capacity with enhanced ballasting, stability and buoyancy characteristics. This vessel 100 comprises twin hulls 102 and 104 joined by a midsection structure 103, with sidewall structures 114 and 116 and bow and stern structures 113 and 115 providing the vessel structure above a large elongated cargo deck 106.

The midsection 103 is interrelated to the twin hulls such that it is water displacing and therefore significantly contributes to the buoyancy of the vessel. The twin hull/midspan configuration may be varied depending upon displacement requirements of the vessel, one such variant being depicted in FIG. 6. The bow of the midsection 103 is contoured relative to the twin hull bows such that the midsection will not pound against the waves in rough seas but rather will "cut" through the water.

The sea water ballasting capability of the vessel is provided through a plurality of ballast tanks 120 in the twin hull structures and 122—124 in the sidewall structures, deep well pumps 118 located in the sidewalls, and sea valves (not shown) communicating with the appropriate ballast tanks. By this arrangement, ballasting is accomplished by opening the sea valves to flood the ballast tanks so as to lower the vessel to the required depth. Elevating the vessel to its normal cruising level is accomplished by activating the deep well pumps 118 to empty the ballast tanks to the degree required. In this regard, the relationship between the twin hulls 102—104 and the intermediate midsection 103 are most important. By providing a midsection 103 of substantial width and of water displacing capacity, the twin hulls can be ballasted with minimum volumes of sea water to maintain the required stability during all phases of vessel operation. This is especially important when sea water ballast constitutes dead, unproductive weight, as when substantial ballasting is required for vessel stability during cruising under loaded conditions.

The structure of the twin hulls and the intermediate midsection are also interrelated such that the cargo deck 106 rides above the fully-loaded waterline when the vessel is in a cruising condition. This provides the vessel with an intact water plane and therefore enhances vessel stability.

The stern section 115 is provided with a cargo barge entry/exit passageway 108 through which barges may be floated when the vessel is submersed. As shown the passageway 108 is a tunnel. Stern doors 110 are provided to water tightly close the vessel cargo area when the vessel is resurfaced. A second set of doors 111 may be located at the forward end of passageway 108 and is preferred so as to provide a double-door lock configuration. The double-door lock provides a restricted area where one or more barges could be loaded or unloaded without exposing the entire cargo deck area to submersed conditions. This double-door lock configuration also enhances vessel safety against unintentional flooding of the cargo deck area.

The deep well pumps 118, or ones similar thereto, are also provided to clear the cargo deck area of water prior to elevating the vessel to its cruising position. When in a submersed condition, the cargo deck area is closed off by water tightly shutting the stern doors prior to elevating the vessel. Then, by pumping the water from the sealed cargo deck area, the vessel can be raised by pumping out excess ballast without the use of complicated air blowing and ballasting systems.

The vessel design of FIGS. 1—4 is depicted as having a barge cargo area capacity for thirteen cargo barges; each barge being 150 feet long by 35 feet wide by 12 feet high and having a load capacity of 1,250 long tons. This design has an overall length of about 950 feet, an overall width of about 140 feet and a height of about 62 feet. The centerline-to-centerline width between the twin hulls is about 96 feet and the depth of each hull is about 33 feet. In this design, any barge up to 70 feet in width could be passed through the stern passageway. Other vessel and barge dimensions of course can be provided within the scope of the invention. With a main vessel cargo area of 120 feet by 630 feet, each cargo barge could be pushed by tug or winched through passageway 108 and positioned in the appropriate location for mooring pending vessel resurfacing. In like manner, each cargo barge could be towed by tug or winched through passageway 108 for off-loading. The position of the barges over the cargo deck, during vessel submersion, may be maintained by means such as a constant tension winch system. When the vessel has resurfaced, the barges may be secured in their relative positions by cable means or by interlocking barge bottom and cargo deck surfaces.

The enclosed stern structure on both sides of passageway 108 are sufficient to house the necessary steering gear, stern door, engine and other operating machinery. The vessel, having twin hulls, can be propelled by propellers mounted by each hull.

Figure 5:
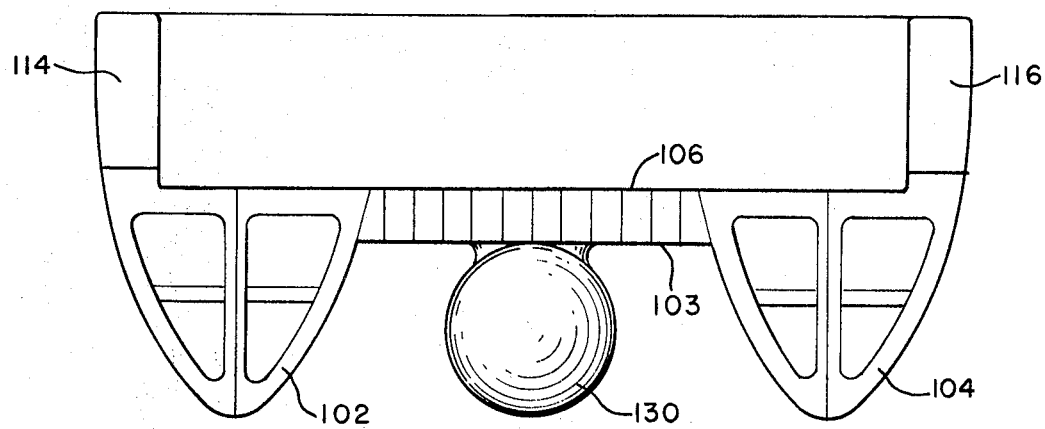
FIG. 5 is a vertical cross section of another embodiment of the carrier vessel of this invention that illustrates a dependent propulsion unit.
Figure 6:
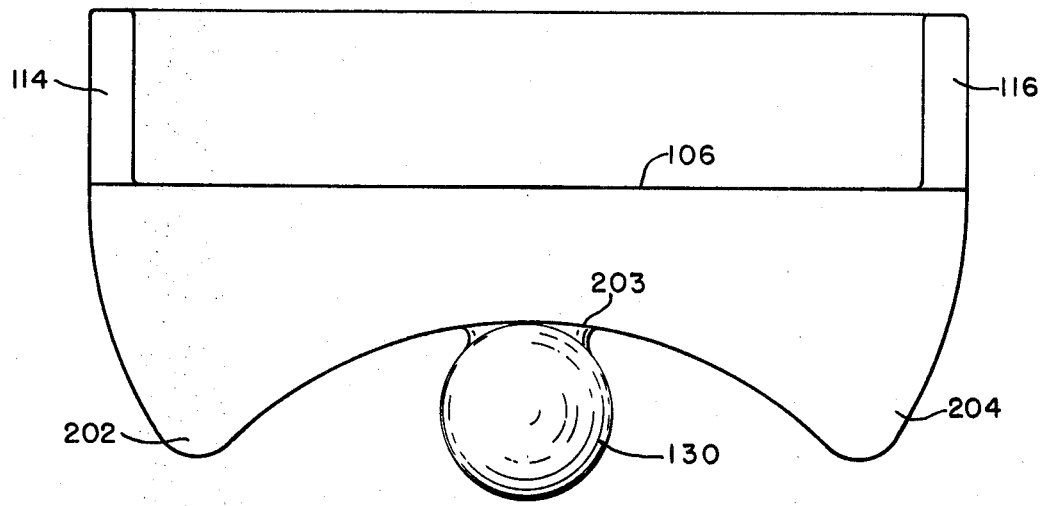
FIG. 6 is a vertical section of another embodiment of the carrier vessel of this invention that illustrates a variant hull configuration and a dependent propulsion unit.
Figure 7:
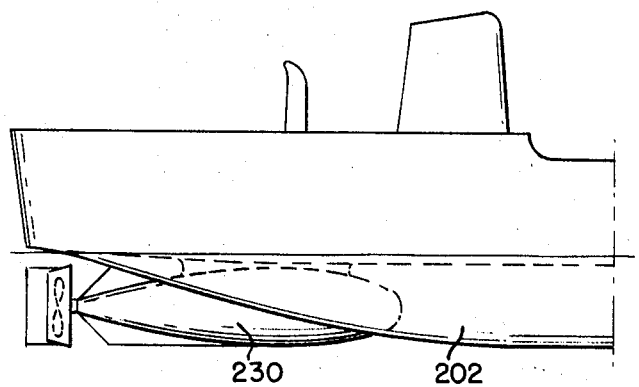
FIG. 7 is a partial side elevation view of the carrier vessel of this invention that illustrates a dependent propulsion unit.

FIGS. 5—7 depict an alternate propulsion system wherein an engine pod 130 is mounted by the midsection 103,203. The pod 130 is a self-contained power plant that can be detached for repair or replacement, thereby reducing inport maintenance time for the vessel. The use of engine pod 130 would be appropriate for smaller configurations of the carrier vessel where the engine room capacity of the FIGS. 1—4 embodiment would not be required.

In operation, the vessel normally will be ballasted to maintain the center of gravity of the vessel below the vessel center of buoyancy. Thus, as the vessel is loaded with cargo barges, a greater volume of water ballast must be taken on to maintain these centers in their proper relation. When the vessel is partially submersed, for barge loading or unloading, the locations of these centers would tend to reverse themselves were it not for the upstanding sidewalls that maintain the integrity of the vessel buoyant object. In the absence of the sidewalls, flooding the cargo deck would create an uncontrollable and unstable condition. By provision of a restricted access to the cargo deck from the stern of the vessel, water over the cargo deck area does not cause instability. Furthermore, by providing stern access to the cargo deck area, the integrity of the sidewall structures is maintained, both from a structural rigidity and strength standpoint.

The embodiments of the invention in which an exclusive property or privilege is claimed are defined as follows:

We claim:

1. A carrier vessel for transporting a plurality of cargo barges which comprises a hull section comprising a pair of longitudinal water-displacing hulls and a longitudinal water-displacing midsection of substantial width intermediate said hulls and connected thereto, the hulls having a depth greater than the midsection such that the hulls depend below the midsection; a cargo deck supported by the hulls and midsection and a structure mounted by the hull section and extending upwardly above the elevation of the cargo deck comprising port and starboard sidewall structures and bow and stern structures, the side wall structures extending longitudinally of the vessel and interconnecting the bow and stern structures, the sidewall and bow and stern structures having outer surfaces providing extensions of the hull section outer surface and having inner surfaces providing a confined volume bottomed by the cargo deck, and the stern structure having an accessway therethrough for barge ingress and egress to said cargo deck; and ballasting means for water ballasting the vessel hull section to submerse the cargo deck to a depth greater than the draft of barges to be floated over the cargo deck and for water ballasting the vessel to maintain buoyancy and stability of the vessel, and means for discharging water ballast so as to resurface the vessel to a normal cruising level; and cargo deck flooding means for controlling the influx of water over the cargo deck when the cargo deck has been submersed below the surface for loading barges.

2. The vessel of claim 1 wherein said stern structure provides an enclosed vessel end section with an elongated passage therethrough forming the cargo deck accessway, said stern structure including a double set of passage closure means arranged in a double-door lock configuration to close said elongated passage and to provide a watertight compartment therebetween.

3. The vessel of claim 1 wherein the forward end of said midsection includes midsection bow means formed to facilitate passage of the vessel through rough seas without pounding.

4. The vessel of claim 1 wherein said hull and midsection are formed to support said cargo deck have the fully loaded water line of the vessel.

5. The vessel of claim 1 wherein said cargo deck has a width substantially greater than the width of the cargo deck accessway and is provided with means to accommodate and position multiple cargo barges arranged in several transverse rows.

6. The vessel of claim 1 wherein the longitudinal hulls are provided with a plurality of water ballast tanks and wherein the wall structures are provided with an additional plurality of water ballast tanks.

7. The vessel of claim 1 wherein the sidewalls extend upward a sufficient distance to provide adequate vessel freeboard when the vessel is submersed and loading or unloading cargo barges.

8. The vessel of claim 1 wherein the ballasting means include deep well pumps positioned in the sidewalls for pumping ballast water from the vessel hull section.

9. The vessel of claim 7 which includes means for removing water from the cargo deck when the cargo deck is submersed and said cargo deck flooding means is operated to terminate the influx of water over the cargo deck.

10. The vessel of claim 1 including a detachable propulsion system pod mounted by the hull midsection and depending therefrom.